Figure 1:
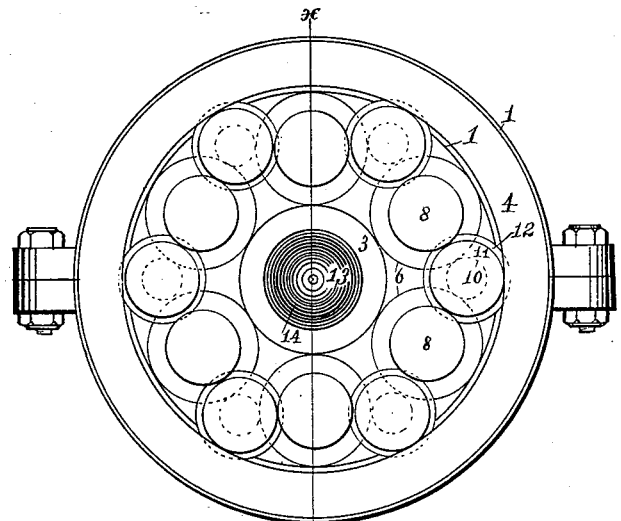

(No Model.) 2 Sheets—Sheet 1.

J. CURTIN.
JOURNAL BOX.

No. 403,992. Patented May 28, 1889.

WITNESSES:
S. S. Gray
J. F. Wilber

INVENTOR.
John Curtin
BY R. M. McDermott
his
ATTORNEY.

(No Model.)  2 Sheets—Sheet 2.

J. CURTIN.
JOURNAL BOX.

No. 403,992.  Patented May 28, 1889.

WITNESSES:
S S Gray
J F Wilbur

INVENTOR
John Curtin
BY R M McDermott
his
ATTORNEY

UNITED STATES PATENT OFFICE.

JOHN CURTIN, OF DENVER, COLORADO, ASSIGNOR TO THE CURTIN ANTI-FRICTION ROLLER BEARING COMPANY, OF SAME PLACE.

JOURNAL-BOX.

SPECIFICATION forming part of Letters Patent No. 403,992, dated May 28, 1889.

Application filed July 25, 1888. Serial No. 280,970. (No model.)

*To all whom it may concern:*

Be it known that I, JOHN CURTIN, a citizen of the United States of America, residing at Denver, in the county of Arapahoe and State of Colorado, have invented certain new and useful Improvements in Anti-Friction Journal-Boxes, of which the following is a specification, reference being had therein to the accompanying drawings.

My invention relates to an improved construction of anti-friction journal-boxes of that type in which the main shaft is supported by and rotates upon rollers themselves capable of rotation in a proper cage or case, and its objects are to produce a bearing of such type in which friction shall be reduced to a minimum, danger of disarrangement, displacement, and loss of parallelism of the rollers shall be avoided, and they be reliably maintained in their proper positions relatively to each other and to the main shaft, a bearing adapted for use either as an intermediate bearing for a shaft, or as the terminal bearings therefor, a bearing in which provision is made for a longitudinal thrust or movement of the main shaft so that it may be particularly fitted for use with the axles of railway and other cars and vehicles, of comparatively simple and economical construction, reference being had to the results and utility, one reliable, durable, and efficient in operation; to which ends it consists in the features and combinations, more particularly hereinafter described and claimed.

In the drawings is illustrated an anti-friction journal-box embodying my invention, in which—

Figure 2:
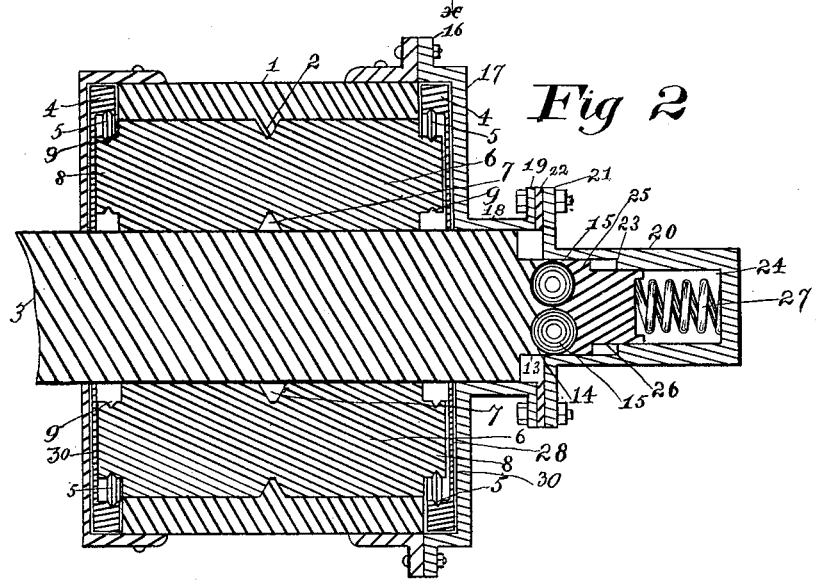
Figure 3:
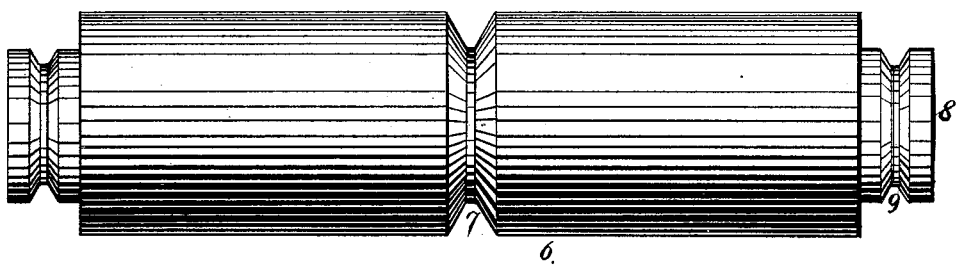
Figure 4:
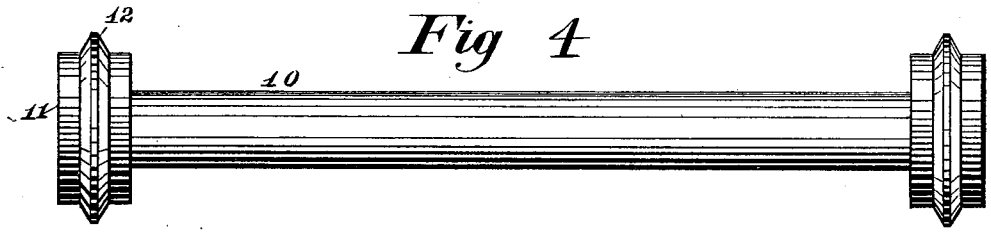
Figure 5:
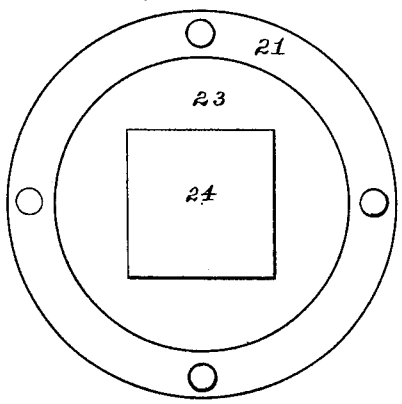

Figure 1 is an end view thereof with the end cap and cover used with terminal boxes removed or left off; Fig. 2, a section in line *x x*, Fig. 1, with section of such cap in place; Fig. 3, a front view of a bearing-roller; Fig. 4, a front view of spacing-roller; Fig. 5, a top or end view of an end thimble.

In the figures, the reference-numeral 1 indicates the case or frame of the journal-box, the same being an open-ended cylinder composed of two or more fractional cylinders united together in any of the ordinary ways—as, for instance, by flanges formed on each section, the flanges of the sections being secured together. Upon the interior periphery of this cylinder is formed or secured a rib, 2, for a purpose hereinafter explained. 3 is the main shaft to be supported and rotated within the box or case. At each end of the case or frame 1 are rings 4, one at each end, and each having an inner peripheral groove, 5.

Surrounding the main shaft 3, and within the case 1, are the bearing-rollers 6, of which as many as may be desired may be used, six, however, as herein shown, being a very suitable number for an ordinary or average sized journal-box. Each is grooved at 7, such grooves registering with and taking upon the inner rib, 2, of the case 1. At each end each roller is formed with a head, 8, and each head has cut upon its periphery a groove, 9. These bearing-rollers are distributed around the main shaft 3 and within the case or frame. Impinging, as they do, on such main shaft, they receive motion therefrom as it is rotated and themselves rotate. As their grooves 7 fit and mesh with the rib 2, they are thereby restrained from lateral movement or displacement, while by the same means rotary motion is communicated to the case when it is so arranged as to be capable of movement. It is necessary, however, that these bearing-rollers should be maintained apart and in their proper positions around the main shaft, and this is accomplished by the smaller or spacing rollers, 10. These lie in the outer spaces between the peripheries of the bearing-rollers 6, but not in contact with the case 1, their peripheries all lying within a circle smaller than the inner periphery of the case. They are formed with heads 11, of larger diameter than the diameter of their bodies, and on each head is formed a rib, 12, these ribs being circumferential on the heads. Such ribs take in and mesh with the grooves 5 and 9. Their position is thus defined and fixed by the bearing-rollers 6 and the rings 4, and they in turn define and fix the relative positions of the bearing-rollers, preventing the latter by their contact with the peripheries thereof from coming together or crowding upon each other. As they impinge upon the bearing-rollers, they receive motion therefrom and rotate in the opposite direction, communicating motion in turn to the rings 4 through the medium of the ribs 12 and grooves 5. Thus as the shaft is rotated every part within or supported by the case is also rotated, bearing-rollers 6, spacing or restraining rollers 10, and rings 4 reducing friction to the lowest possible limit. The case 1 may be inclosed in any suitable housing for its support, or it may be supported upon any suitable bracket or device for sustaining it and be itself stationary. As thus far described, this anti-friction journal-box is peculiarly adapted for an intermediate bearing—that is, a bearing supporting a shaft at some point in its length other than its ends—although under ordinary circumstances or where there is no danger of end thrust or movement of the shaft it is also well adapted for terminal or end bearings. When, however, there is danger of such thrust or movement or where it is necessary or desirable that there should be such thrust or movement, as in the case of axles of railway-cars and other vehicles, provision therefor is made as follows:

The end of the shaft is stepped, as shown at 13, and upon this reduced end is formed a groove to constitute one-half of the inclosing-bearing 14 for end bearing-balls, 15. Upon the case 1 is secured a cap formed of a flanged ring, 16, concentric to the case and fitting against the flange of the case 1, from which extends inwardly the web or plate 17, which then extends outwardly, as at 18, an upturned flange, 19, being at the outer end of part 18. These parts 16, 17, 18, and 19, forming the cap, may be formed of one piece, as shown, or may be of two or more pieces secured together in well-known manner. The diameter of the opening at 18 is just sufficiently larger than that of the body of the main shaft 3 to permit the latter to rotate freely therein and without impingement with the wall 18.

Secured to the cap by means of flanges 19 and 21 is a thimble, 20, in whose inner end is a circular cavity slightly larger than the reduced end of the main shaft 3, and below or beyond such circular cavity is a square or angled cavity, 24, the point of union between the circular and angled interior cavities of the thimble being at the interior ledge, 23. Within this thimble is seated the bearing-block 25, having a shank, 26, square or angled to fit in the cavity 24 and prevent the bearing-block from turning within the thimble. Upon its inner end is a groove corresponding to the groove on the outer end of the reduced portion of the main shaft and forming part of the inclosing-bearing 14. Within the cavity 24 and between the end of shank 26 and the end wall of the thimble is a spring, 27, tending to force the bearing-block 25 out of the thimble.

The parts are so formed and so arranged relatively to each other that when in normal position and with no end thrust or movement imparted to the shaft they are in the position shown in Fig. 2, the part 18 being somewhat longer than the part of the main shaft it incloses, and the circular cavity in the thimble being of a depth equal to the reduced portion of the shaft plus the head of the bearing-block 25. Then, while end or lengthwise movement is permitted to the shaft or axle 3, the amount thereof is limited by the inner end of the thimble and the ledge 23 therein, they acting as stops against which the steps in the shaft and the bearing-block take. In such motion the spring 27 forces the bearing-block 25 against or toward the end of the shaft 3, preventing shake or rattle thereof, while friction between the end of the shaft and the bearing-block is very largely reduced by the bearing-balls 15. To permit compensation for any wear of such balls or of the groove 14, it is well to place a gasket or washer, 22, between the flanges 19 and 21, the compression of the gasket permitting the flanges to be brought closer together when desired or needed.

If desired to more securely inclose the bearings in order to protect them from dust, &c., the rings 4 may be provided with an inwardly-extending flange or web, 30, formed integral therewith or secured thereto. Such flange or web 30 has a central aperture just sufficient to permit shaft 3 to pass through and rotate therein without impingement on the wall of the aperture.

It is evident that the locations of grooves 5 and 9 and the rib 12 might be reversed relatively to each other, as also might be the relative locations of groove 7 and ribs 2.

The ring 4 may be made of two circumferential sections, each containing half of a groove, 5, such groove being then formed by beveling or concaving the inner edge of the inner periphery of each section, the sections being united together by transverse bolts, such construction permitting adjustment and compensation for wear either of the grooves 5 or ribs 12.

Having thus described my invention, what I claim is—

1. The combination of the case or box having interior rib, 2, the supporting-rollers having grooves 7 in their bodies and end heads with grooves 9, the rollers 10, with heads having ribs 12, and the end rings having grooves 5, substantially as set forth.

2. A journal-bearing comprising the case or box having interior rib, 2, supporting-rollers grooved at 7 and 9, rollers 10, with heads having ribs 12, end rings having grooves 5, a cap secured to the case and surrounding the end of the body of the main shaft, a thimble, 20, secured to the cap, a bearing-block, 25, with an angled shank, 26, within the thimble, and a spring therein acting upon the end of the shank, substantially as set forth.

3. A journal-bearing comprising an outer case with an internal rib, supporting-rollers with grooves fitting upon and meshing with such rib, supplementary or spacing rollers maintaining the supporting-rollers in a position away from each other, end rings maintaining such supplementary or spacing rollers in operative position, an end or cap, a thimble secured to such cap, and a spring-bearing for the end of the main shaft in such thimble, substantially as set forth.

4. The combination of the case 1, with rib 2, rollers 6, having grooves 7 and grooved heads 8, rollers 10, having ribbed heads 11, and end rings, 4, with internal grooves, 5, substantially as set forth.

5. A journal-bearing comprising the case, the supporting and the spacing-rollers, of the cap steps or bends 16 17 18 19, thimble 20, with square or angled cavity 24, shaft 3, with reduced portion 13, bearing-block 25, ball-bearings 15, and spring 27, substantially as set forth.

In testimony whereof I affix my signature in presence of two witnesses.

JOHN CURTIN.

Witnesses:
Z. F. WILBER,
B. L. POLLOCK.